March 28, 1950 H. M. DODGE 2,502,313
VIBRATION ABSORBING SUPPORT
Filed March 23, 1945

INVENTOR.
Howard M. Dodge
BY
Evans & McCoy
ATTORNEYS

Patented Mar. 28, 1950

2,502,313

UNITED STATES PATENT OFFICE 2,502,313

VIBRATION ABSORBING SUPPORT

Howard M. Dodge, Wabash, Ind., assignor to The General Tire & Rubber Company, Akron, Ohio, a corporation of Ohio Application March 23, 1945, Serial No. 584,409

6 Claims. (Cl. 248—358)

This invention relates to a vibration absorbing support for impeding transmission of vibration from a machine or instrument to its support, or from the support to the instrument or machine, the cushioning portion of the support being composed of rubber and so formed that it is yieldable axially and also in directions transverse to its axis.

The invention has for an object to provide a support in which the rubber cushioning body is so shaped that it has a high degree of resiliency both axially and transversely of its axis, so as to effectively cushion vibratory impulses in any direction, and which is adapted to provide a vibration absorbing support for either a superposed or a suspended load.

A further object of the invention is to provide a support in which the rubber cushioning body is effectively reinforced by the attaching plates secured to its ends.

A further object it to provide a support suitable for use in supporting machines or instruments which vary considerably in weight and which is an effective shock absorber throughout a relatively large range of loads.

With the above and other objects in view, the invention may be said to comprise the support as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which Fig. 1 is a top plan view of the support embodying the invention;

Figure 1:
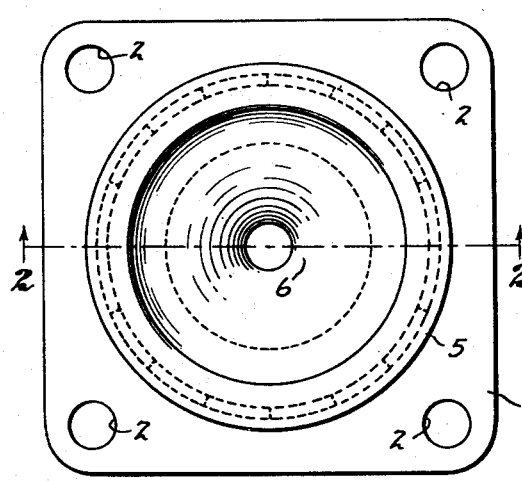
Figure 2:
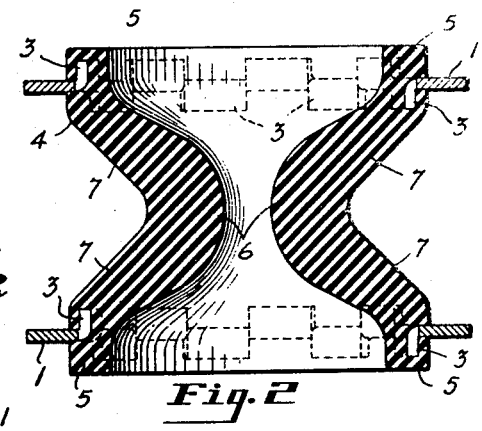
Fig. 2 is a section taken on the line indicated at 2—2 of Fig. 1.

Referring to the accompanying drawings, the support of the present invention is provided with attaching plates 1 at its opposite ends which may be identical in construction and which may be provided with suitable bolt holes 2 for attachment to the supporting and supported members. Each of the attaching plates 1 has a central circular opening and is provided with tongues or flanges 3 that are struck up from the body thereof at the margin of the central opening. The tongues or flanges 3 are bent alternately upwardly and downwardly with respect to the plate. The attaching plates 1 are secured to the opposite ends of a molded tubular cushioning body 4 of rubber which has circular edge portions 5 at its ends in which the flanges 3 of the supported plate are embedded, the flanges 3 forming a reinforcing ring in the tubular wall of the rubber cushioning body.

The tubular rubber body 4 has a thick wall center portion 6 of less diameter than the end portions 5 and has walls 7 which have interior and exterior faces of conical form and which gradually decreases in thickness from the center portion 6 to the edge portions 5.

Superimposed loads put the central portion of the rubber body under compression and, by reason of the fact that the central portion of the rubber body is of considerably smaller diameter than the end portions, the plates 1 and parts attached thereto may have relative lateral or tilting movements with respect to one another, all of which movements are resiliently cushioned by the rubber body 4. If the load is suspended the conical end walls are under tension and relative lateral and tilting movements as well as relative axial movements are cushioned.

Figure 3:
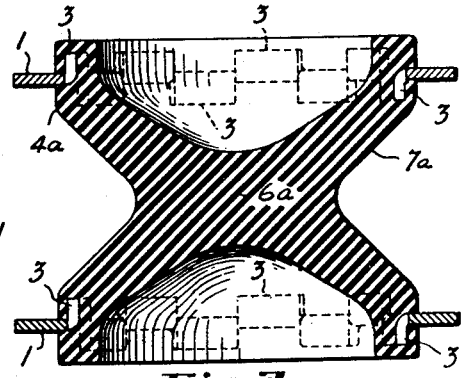
Fig. 3 is a section similar to Fig. 2, showing a slightly modified construction.
Figure 4:
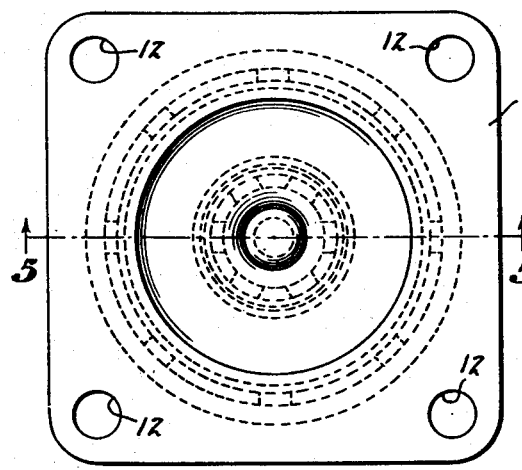
Fig. 4 is a top plan view of another support embodying the invention.
Figures 5, 6, 7:
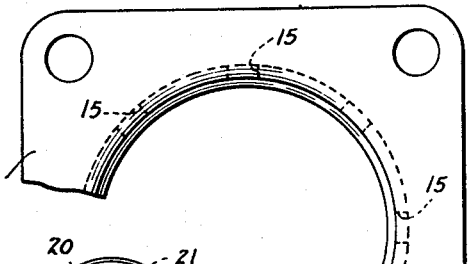
Fig. 5 is a section taken on the line indicated at 5—5 in Fig. 4.
Fig. 6 is a fragmentary plan view of the supporting plate employed in the support shown in Figs. 4 and 5.
Fig. 7 is a section taken on the line indicated at 7—7 in Fig. 5.

In Fig. 3 of the drawings a slightly modified construction is shown, in which the rubber body 4a has a solid central portion 6a of reduced diameter and tapering conical wall portions 7a which correspond substantially to the tapering walls 7 in the modification first described. The cushioning action of the rubber member 4a is similar to that of the cushioning member 4 above described, the solid center making the support somewhat stiffer and increasing its load supporting capacity.

In Figs. 4 to 7 of the drawings a further modification of the invention is illustrated, in which the support is provided with attaching plates 11 provided with bolt holes 12, the plates 11 being provided with a circular central opening and a continuous flange 13 around the margin of the opening. The flange 13 is of substantially cylindrical form and has an inturned edge 14. Spaced openings 15 are provided in the flange 13 and the flange 13 is embedded in a rubber cushioning body 16. The cushioning body 16 is of conical form interiorly and exteriorly and is provided with an upturned edge portion 17 at its large end in which the flange 13 of the attaching plate 11 is embedded. The small end of the cushioning member 16 is provided with a substantially cylindrical edge portion 18 in which is embedded a marginal flange 19 of an attaching disk 20.

The support is composed of two frusto conical units, each composed of the attaching plate 11, the connecting disk 20 and the conical rubber body 16. The marginal flange 19 of each connecting disk is provided with openings 21 for anchoring the flanges 19 in the rubber body 16 and connecting disks 20 are joined together centrally by means of a rivet 22.

In each of the modifications formed the rubber body may be molded and vulcanized upon the flanged edges of the metal plates to embed the flanges in the rubber.

It is to be understood that variations and modifications of the specific device herein shown and described for purposes of illustration, may be made without departing from the spirit of the invention.

What I claim is:

1. A vibration absorbing support having a cushioning body provided with a relatively stiff central portion and hollow flaring resilient rubber end portions of substantially conical form that converge to said central portion, and an attaching plate at each end of said support, said plates having openings of larger diameter than said central portion and flanges at the margins of the openings embedded in the end edges of said support.

2. A vibration absorbing support having a relatively stiff central portion and hollow flaring resilient rubber end portions of substantially conical form that converge to said central portion, and plates secured to the annular ends of said support, said plates being disposed perpendicular to the axis of the support and having edge portions forming attaching flanges extending around the peripheries of said annular ends.

3. A vibration absorbing support having a relatively stiff central portion and hollow flaring resilient rubber end portions of substantially conical form that converge to said central portion, and an attaching plate at each end of said support, said plates having openings of greater diameter than said central portion and flanges at the margins of the openings embedded in the end edges of said support.

4. A vibration absorbing support comprising a body of rubber having a relatively stiff central portion and annular resilient end portions of substantially conical form and converging to said central portion, and attaching plates secured to the annular end edges of said support, each plate being perpendicular to the axis of the support and having an edge portion forming a flange projecting outwardly from the annular end to which the plate is attached.

5. A vibration absorbing support comprising a tubular body of resilient rubber having a portion of reduced external diameter and increased wall thickness midway between its ends, the ends of said tubular body flaring from the portion of reduced diameter, and an annular attaching plate secured to said tubular body adjacent each end thereof, each attaching plate being of an external diameter greater than the end of the tubular body to which it is attached and projecting outwardly therefrom.

6. A vibration absorbing support comprising two annular flaring tubular resilient rubber units disposed small end to small end, an annular attaching plate at the large end of each of said units and having a marginal portion attached to the large end of said unit, and two connecting disks secured together and each having a peripheral portion secured to the small ends of one of said units.

HOWARD M. DODGE.

REFERENCES CITED

The following references are of record in the file of this patent:

UNITED STATES PATENTS

| Number | Name | Date |
|---|---|---|
| 1,477,331 | Ely | Dec. 11, 1923 |
| 1,892,065 | Markey | Dec. 27, 1932 |
| 1,948,476 | Saurer | Feb. 20, 1934 |
| 2,018,860 | Lord | Oct. 29, 1935 |
| 2,132,840 | Workman et al. | Oct. 11, 1938 |